June 7, 1966  J. A. YARBROUGH  3,254,526
METHOD AND APPARATUS OF TESTING FLUID
IMPERMEABLE FILMS FOR HOLES
Filed Jan. 27, 1964

INVENTOR.
JERRY A. YARBROUGH

BY *McLean and Boustead*

ATTORNEYS

United States Patent Office 3,254,526
Patented June 7, 1966

3,254,526
METHOD AND APPARATUS OF TESTING FLUID-IMPERMEABLE FILMS FOR HOLES
Jerry A. Yarbrough, Calumet City, Ill., assignor to Sinclair Research, Inc., New York, N.Y., a corporation of Delaware
Filed Jan. 27, 1964, Ser. No. 340,325
6 Claims. (Cl. 73—40)

This invention relates to a method for testing liquid-impermeable films and more specifically to a method of testing liquid-impermeable films for holes even if the holes are microscopically small.

In the production of a variety of films, it is often imperative that every hole, no matter how small, be detected and mended. One example is the plastic film that is to be employed as the barrier in a selective permeation process. Selective permeation is a molecular diffusion process wherein the product flow rates are very low, on the order of $10^{-5}$ moles/hr.-ft.$^2$-(1000 p.s.i./in.) for gases. Obviously, holes in the film need be only a few millionths of a square inch in area to flood the product with undesirable feed components. In fact, it has been observed that a hole approximately one-millionth of a square inch in area will cancel the separating effect of over one square foot of polyfluorocarbon film in a selective permeation process for separating the components of air.

Various inspection and testing methods heretofore available for locating small holes in films have not proved entirely satisfactory for one reason or another. Visual inspection of thin transparent films, for example, has proven useless for detection of tiny holes. Microscopic inspection of films using special lighting is enormously time-consuming and not very reliable. Test methods which use a gas or liquid under pressure are entirely unsuitable for thin, delicate films for they invariably cause damage to the film.

The present invention is subject to none of the above limitations on reliability, time, hole size, or strain on the film. The new test method comprises placing an absorbent sheet on a smooth surface of a material having a non-porous body and having a vacuum application means as, for instance, through one or more holes in the non-porous body. The sheet is positioned to cover the vacuum application means and overlying the sheet is the film to be tested. Vacuum is applied by the vacuum application means and the exposed surface of the film is wetted with a liquid. Any holes in the film are detected by inspecting the sheet for wet spots. If desired, the vacuum and wetting steps can be reversed in sequence.

The test method of the invention can be described by reference to FIGURES 1, 2, and 3 of the attached drawing.

Figure 1:
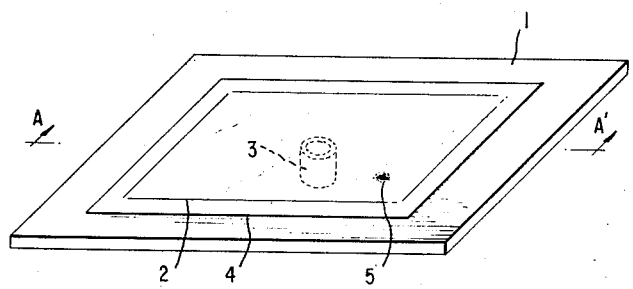
FIGURE 1 is a perspective view of a simple embodiment of an apparatus which can be employed in the present invention, particularly in the testing of relatively small areas of film.
Figure 2:
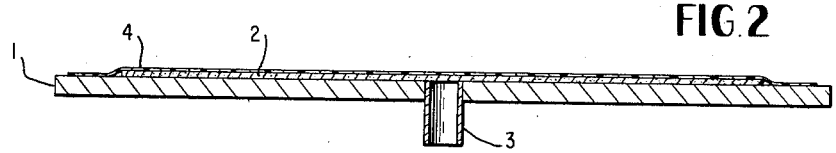
FIGURE 2 is a longitudinal cross section of the device of FIGURE 1, taken along lines A–A′ in FIGURE 1.

FIGURE 1 shows a smooth, non-porous surface 1 on which an absorbent sheet 2 is placed. Any smooth-surfaced non-porous material can be employed. By "non-porous" is meant material that will not pass gas therethrough under the effect of vacuum, as, for example, smooth surfaces of metal, glass, stone, formica, ceramics, etc. The surface can take a variety of shapes and forms which will become evident to one skilled in the art upon further description of the invention. The absorbent sheet material is preferably of a cellulosic material such as paper but any sheets, for instance, cloth fabric, etc. which absorb liquid to leave an identifiable wet spot can be employed.

The absorbent fibrous sheet 2 covers a small hole 3 which is connected through a valve and suitable tubing to a vacuum source (not shown). If desired, the surface 1 can contain a plurality of holes or perforations at which a vacuum is similarly applied. In this latter case, the absorbent fibrous sheet should cover all holes under which the vacuum is applied. The film 4 to be tested for leaks is placed over the absorbent sheet 2 so that it covers the sheet and each edge of the film extends beyond the edges of the sheet and touches against the smooth surface in sealing relationship. In this manner, loss of vacuum is prevented, for an application of a vacuum at hole 3, the vacuum will spread (i.e. a low pressure region will extend) through the absorbent sheet 2 to the edges of the film 4 and will seal the film edges against the smooth surface 1. If the film is wrinkled it may be necessary to smooth it out in order to establish the vacuum. Any vacuum can be employed as long as the pressure differential across the surfaces of the film is sufficient to pull liquid through whatever holes present in the film. The method of the present invention, for example, is capable of easily maintaining under a sheet of plastic film, a vacuum as low as one centimeter of mercury. The pressure which drives the test liquid through holes in a plastic film causes no rupture stress since the absorbent sheet and its supporting base support the film. Due to the low order of stress which can be employed, even the thinnest and most fragile of films can be safely tested by the method of the invention.

After the vacuum is established as described above, liquid can be applied to the exposed surface of the film by pouring, wiping or other means. Any hole in the film will be revealed shortly by a wet spot or portion 5 on the absorbent fibrous sheet 2. The test liquid can be virtually any low viscosity or free-flowing liquid that will easily pass through small holes and does not have a deleterious effect on the film being tested and includes water, hydrocarbons, alcohols, esters, ketones and the like. The test liquid can also contain a dissolved dye, in which case a permanent record of a hole will be left on the absorbent fibrous sheet. If a liquid having a natural color is used, a dark stain will likewise be left as a permanent record on the absorbent sheet material. On the other hand, when a pure clear liquid is employed, the wet spot or stain will dissipate as the liquid is vaporized. Hence, choosing a test liquid should take into consideration the length of time required to identify and mark the wet spots. Water and isotane, for example, leave a more lasting spot than methanol. Testing with a pure clear volatile liquid offers the advantage that the same absorbent sheet can be used to test any number of film sheets in succession because no permanent stain remains on the absorbent fibrous sheet.

Figure 3:
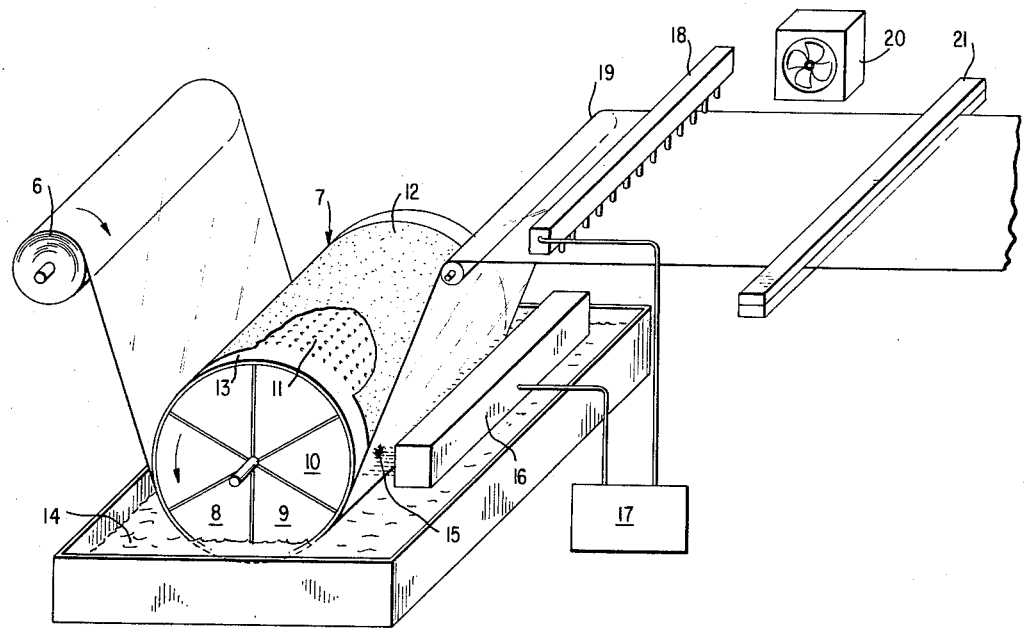
FIGURE 3 is a perspective view of a device for continuously conducting the testing method.

It will be obvious to one of ordinary skill in the art that a number of modifications and arrangements of equipment are possible without departing from the spirit of the present invention. For instance, FIGURE 3 shows an embodiment of a device for continuously testing thin films by the method of the present invention. Referring to FIGURE 3, sheet film is fed from roll 6 to a rotating drum 7 which is partitioned into a number of segments 8, 9, 10, etc. This drum is made so that when the cylindrical surface of a segment passes through the liquid bath 14, such as segments 8 and 9, it is evacuated; and when the segment on rotation emerges from the bath, such as segment 10, the vacuum is released and the segment preferably pressured slightly above atmospheric. The cylindrical portion 11 of drum 7 is of non-porous material, preferably metal, and the center section of this cylinder is perforated. Around this perforated section is placed an absorbent fibrous sheet 12. But for the perforations, the drum is closed. The perforated section of the cylinder is not as wide as the sheet 12, which is in turn less wide than the film to be tested. Each end of the cylindrical surface is smooth to provide a surface 13 against which the film can seal upon evacuation of the drum. This type of drum is known to those skilled in the art of mechanical separation, see McCabe, W. L. and Smith, J. C., Unit Operations of Chemical Engineering, McGraw Hill, 1956, pp. 332f.

The drum 7 is positioned over a liquid bath 14 so that a portion of the drum passes through the bath. The liquid being under the influence of the vacuum established in the segment or segments, will flow from the bath through any hole in the test film and wet or stain the absorbent fibrous sheet. A spot 15 can be seen and marked by an observer stationed so he can watch the drum as it comes out of the bath. By controlling temperature and humidity or by selecting different liquids for the bath, it is possible to control the length of time a spot will remain on the cloth. Therefore, a spot can be made to disappear in one-half a drum revolution to guarantee that any spot seen at the observation station corresponds to a hole in the film being tested at the given time.

Alternatively, as also shown in FIGURE 3, an electronic scanner 16 such as a battery of photoelectric cells can be used to register any spots on the cloth. The scanner is connected to a digital computer 17, which processes information from the photoelectric cells and after a proper delay, signals a certain valve (not shown) on rack 18 to open. Rack 18 has a multitude of nozzles each with its own valve so that a marking dye or a sealer can be sprayed onto any area of the film as directed by the computer. The film continues over a roller 19 to a hot air blower 20 and wiping pads 21 to be dried before being rolled up or processed.

The sheet films which can be tested by the method of the present invention are solid films made of impermeable material and include for instance natural and synthetic rubber films, cellulosic films, and the wide variety of plastic materials such as polyethylene, polyester resin, nylon, polytetrafluoroethylene, fluorinated ethylene-propylene copolymer, polystyrene and the like. The present invention is generally applicable to solid film sheets having a thickness say of up to about +.05 inch or more and is particularly useful for testing delicate films, for instance, plastic films of about 0.001 inch thickness because the film can undergo little if any net rupture strain during the test and consequently defects in the film already present are not aggravated nor is any new damage caused.

It is claimed:

1. A method of testing liquid-impermeable films for holes which consists essentially of placing an absorbent sheet on a smooth surface of non-porous material having vacuum application means therethrough, said sheet being positioned to cover said means, overlying the sheet with the liquid-impermeable film to be tested, applying a vacuum by said vacuum application means, wetting the exposed surface of the film with a liquid and inspecting the sheet for a wet spot.

2. The method of claim 1 wherein the absorbent sheet is paper.

3. The method of claim 2 wherein the film tested is of a plastic material.

4. The method of claim 3 wherein the film has a thickness of about 0.001 inch.

5. A method for testing liquid-impermeable sheet films for holes which comprises placing an absorbent sheet onto a drum having a smooth, non-porous and perforated cylindrical surface, said drum being internally partitioned into segments, rotating the drum to pass a portion of said drum through a liquid bath, continuously feeding the sheet film onto the rotating drum to overlie the absorbent sheet, evacuating the internal section of the drum whose cylindrical surface is passing through said liquid bath, releasing the vacuum after the cylindrical surface of said section emerges from the liquid bath and inspecting the absorbent sheet emerging from said liquid bath for a wet spot.

6. An apparatus for testing liquid-impermeable sheet films for holes which consists essentially of a rotatable drum internally partitioned into segments, said drum having a smooth, non-porous, perforated, cylindrical surface, an absorbent sheet around said surface, a bath for holding liquid and in which a portion of the drum is positioned, means for feeding sheet film onto said drum to overly said absorbent sheet, and means for applying and releasing a vacuum to said segments, said means for applying vacuum being effective when a given segment of the drum is in the bath.

References Cited by the Examiner
UNITED STATES PATENTS

| | | | |
|---|---|---|---|
| 1,960,281 | 5/1934 | Schweizer | 73—37 X |
| 2,294,511 | 9/1942 | Neiman | 73—159 |
| 2,993,368 | 7/1961 | Schlein | 73—38 |

LOUIS R. PRINCE, *Primary Examiner.*